United States Patent [19]

Hettinga

[11] Patent Number: 5,665,405
[45] Date of Patent: Sep. 9, 1997

[54] SELF-CONTAINED MOLDING APPARATUS AND METHOD FOR CLAMPING THE MOLD UNIT OF AN INJECTION MOLD APPARATUS

[76] Inventor: Siebolt Hettinga, 2123 NW. 111th St., Des Moines, Iowa 50325

[21] Appl. No.: 391,591

[22] Filed: Feb. 21, 1995

[51] Int. Cl.⁶ .................................................. B29C 45/64
[52] U.S. Cl. .......................... 425/589; 425/590; 425/595
[58] Field of Search ............................... 425/589, 590, 425/595, 450.1, 451.2, 451.9

[56] References Cited

U.S. PATENT DOCUMENTS

| | | | |
|---|---|---|---|
| 3,156,014 | 11/1964 | Wenger | 425/589 |
| 3,697,212 | 10/1972 | Herbst | 425/451.2 |
| 3,737,278 | 6/1973 | Putzler | 425/590 |
| 4,105,385 | 8/1978 | Hehl | 425/589 |
| 4,201,533 | 5/1980 | Holzschuh | 425/451.9 |
| 4,403,810 | 9/1983 | Bieneck | 425/589 |
| 4,425,091 | 1/1984 | Prince | 425/589 |
| 5,368,463 | 11/1994 | Kassner et al. | 425/590 |

*Primary Examiner*—James P. MacKey
*Attorney, Agent, or Firm*—Brian J. Laurenzo; Kent A. Herink

[57] ABSTRACT

A method and apparatus for clamping a plastic injection mold. The apparatus utilizes leader pins connected directly to a pair of mold sections. By directly connecting the leader pins to the mold sections, standard platens and housings can be eliminated, thereby reducing the overall weight and dimensions of the apparatus. An ejection assembly and runner assembly are bolted onto the mold sections, but are not subjected to clamping pressures during the molding process. Since these assemblies are not subject to clamping pressures, the standard housings usually provided on these assemblies may also be eliminated.

34 Claims, 3 Drawing Sheets

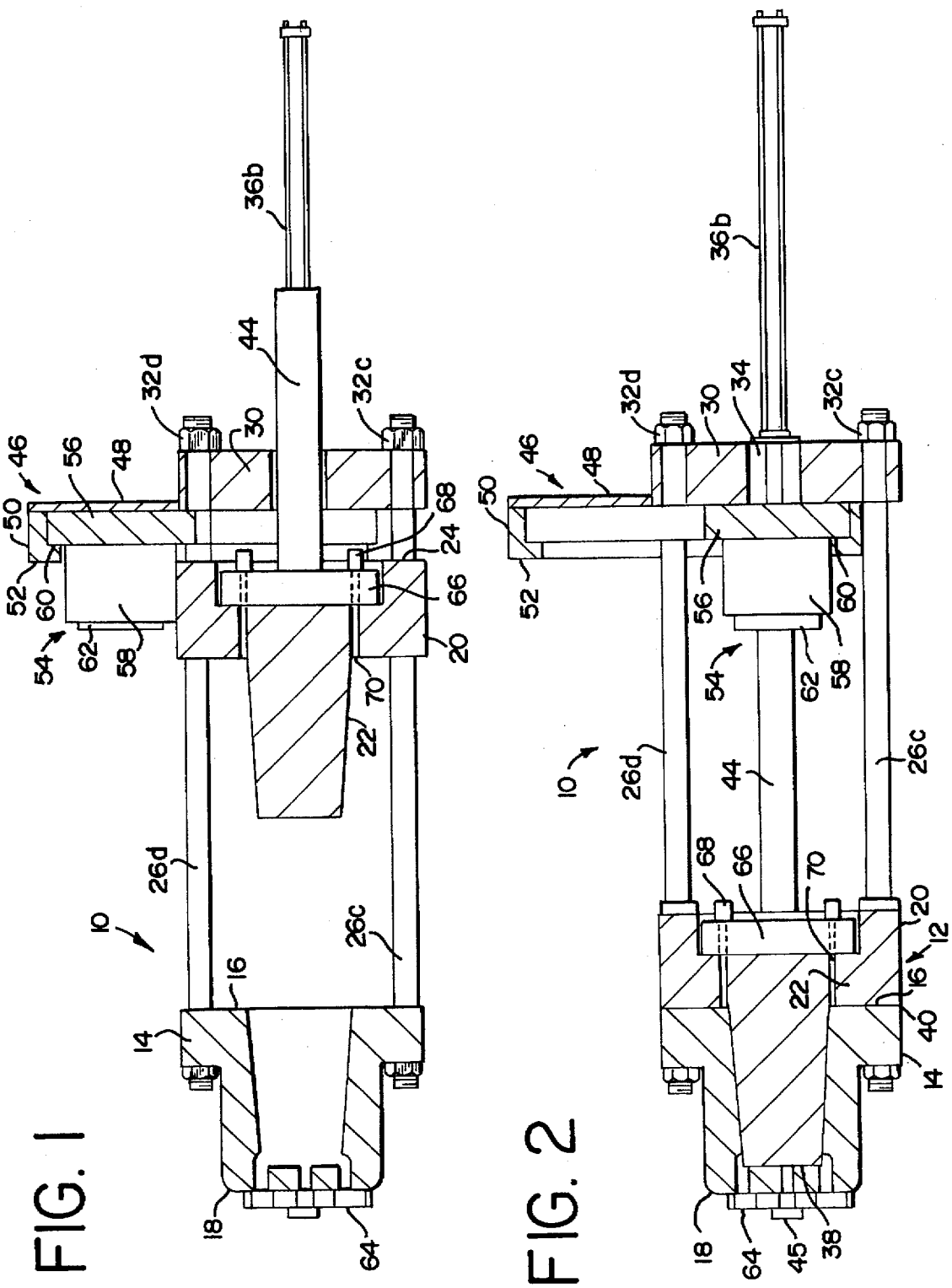

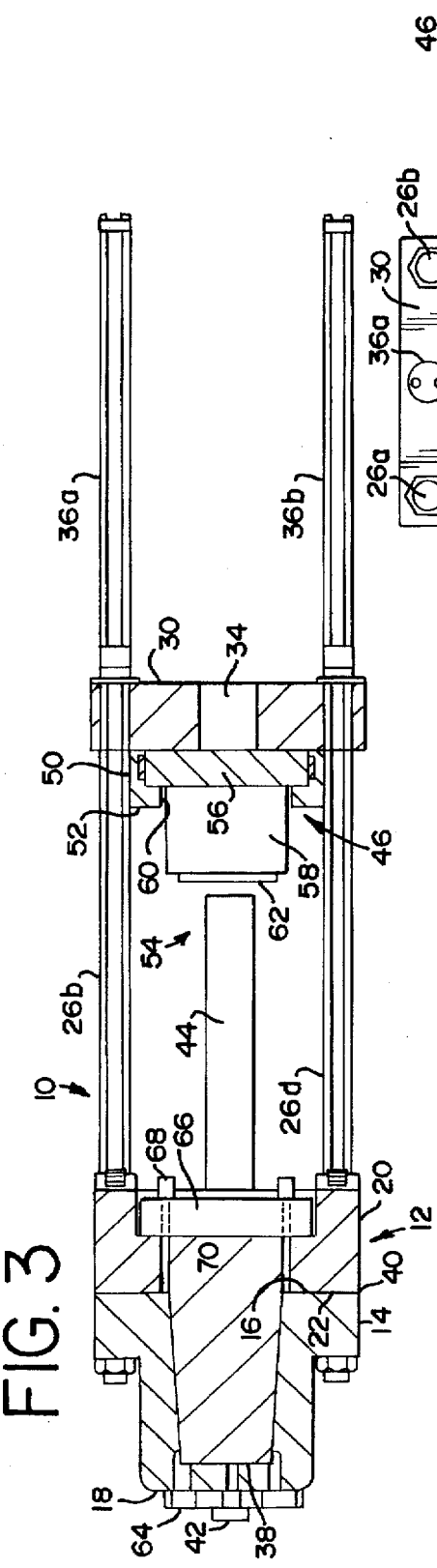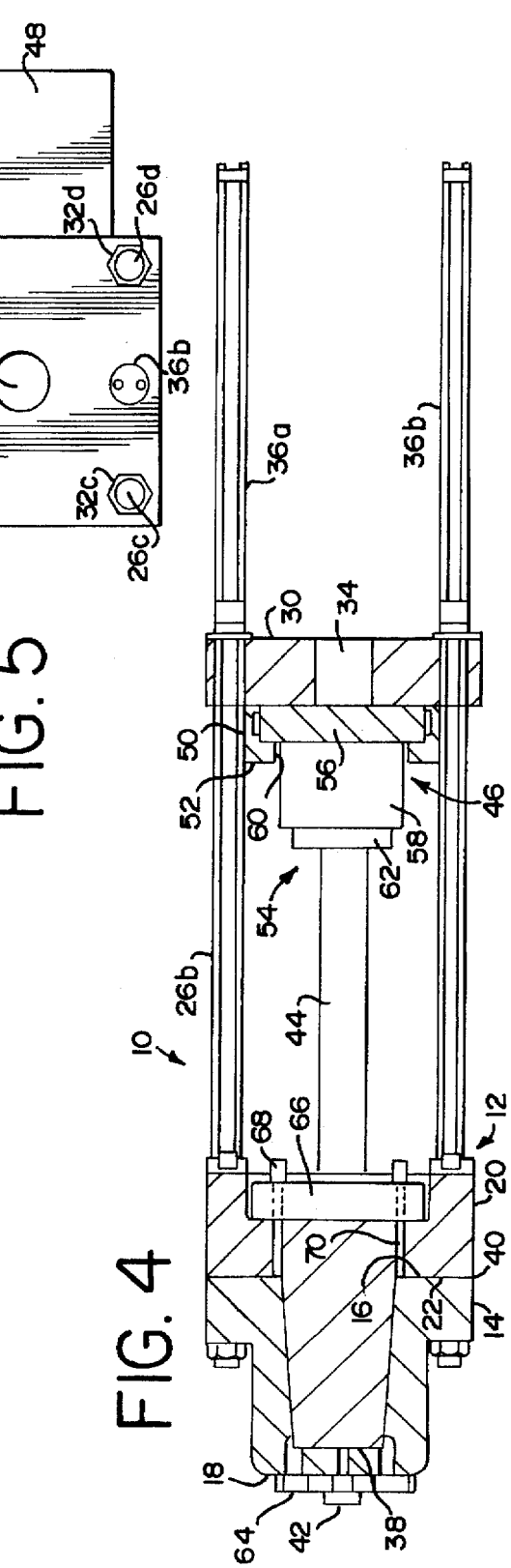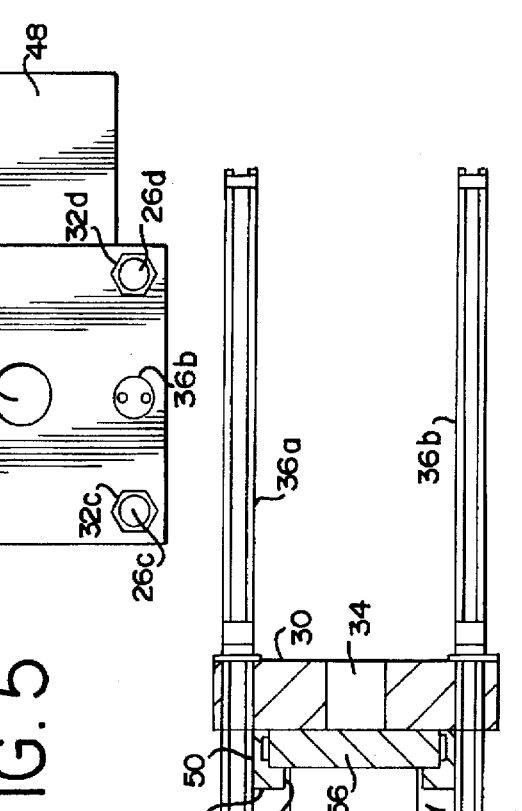

SELF-CONTAINED MOLDING APPARATUS AND METHOD FOR CLAMPING THE MOLD UNIT OF AN INJECTION MOLD APPARATUS

BACKGROUND OF THE INVENTION

This invention relates to a self-contained molding apparatus and a method for clamping together the mold sections of a mold unit to form a sealed mold cavity and, more particularly, to a clamping apparatus and method for clamping which is compact, uses only a small amount of energy, and eliminates the need for bulky external clamping units.

Injection molding machines generally include a two-section mold unit wherein one of the mold sections is stationary and the other mold section generally is movable between an open position away from the stationary mold section and a closed position wherein the two mold sections are sealed in contact engagement to form the mold cavity. The stationary mold section generally includes an opening for the injection of a mold material into the cavity. When the mold material is injected under high pressure into the mold cavity, the mold sections must be in positive sealed engagement to prevent the escape of mold material from the mold cavity. This sealed engagement is usually accomplished by clamping the mold sections together after the sections have been brought into engagement.

Clamping is typically accomplished with the use of very high pressure clamps which are secured to a mold frame. The mold frame generally has a set of tie bars interconnecting a pair of pressure plates. One pressure plate is typically fixed and nonmovable while the other pressure plate slides back and forth along the tie bars to allow the pressure plates to move into and out of proximity with one another. A high pressure clamp is braced against the mold frame on one end and secured to the movable pressure plate on the other. The entire assembly is designed to produce extreme amounts of pressure between the movable pressure plate and the stationary pressure plate with the high pressure clamp. The clamping assembly is of a general construction to allow various types of mold units to be placed within the clamping assembly. Before a mold unit can be placed between the pressure plates of a clamping assembly, a housing must be provided to allow the pressure plates to evenly contact the halves of the mold unit and to prevent uneven pressure being applied to the halves of the mold unit. Additionally, since the mold unit typically requires an ejector assembly to remove the part after the molding process has been completed and a runner assembly to properly inject the plastic material into the mold cavity, these assemblies must also be provided with specially designed housings to allow them to fit properly between the mold units and the pressure plates and to allow these assemblies to withstand the extreme pressures generated during the molding process.

The requirement for the specially designed assemblies and housings leads to increased costs and added weight to the clamping apparatus. Although many such assemblies and housings are of a standard variety and, therefore, available without the added cost of customized tooling, very large or complicated parts typically require specialized housings, runners, and ejection assemblies, the manufacturing of which is extremely time and capital intensive. Furthermore, since these specialized assemblies are generally integrated with the mold unit, failure of these assemblies leads to significant downtime. Not only must the failed assembly be replaced, but a new assembly must be integrated with the mold unit. Because withdrawing the failed assembly and integrating a new assembly can often not be done "in-house," a failed assembly can often take a mold unit out of service for several weeks.

The high pressure under which typical molding machines operate, coupled with the added weight of specialized housings requires a very large, very powerful clamping device to properly secure the mold units together. Due to the high pressure associated with such molding operations, the tie bars of the mold frame must be very strong, which also makes them unavoidably heavy. Additionally, the cost of the parts associated with the clamping operation increases with the weight and durability requirements of the parts. Therefore, typical molding machines are very expensive and very heavy.

The specialized housings for the mold unit, the runner assembly, and the ejection assembly require an increased amount of daylight between the two pressure plates. This increased daylight requires that the clamping assembly be very long to allow the mold units to retract far enough from one another to allow the finished plastic article to be removed from the mold cavity. Just as the increased bulk of housings necessitates a lengthened apparatus, the added weight of the housings increases the overall weight of the apparatus.

The difficulties encountered in the prior art discussed hereinabove are substantially eliminated by the present invention.

SUMMARY OF THE INVENTION

Accordingly, it is an object of the present invention to provide a plastic injection molding apparatus which is smaller and lighter than prior art devices.

Another object of the present invention is to provide a plastic injection molding apparatus which eliminates the need for specially designed housings surrounding the halves of the mold unit.

Still another object of the present invention is to provide a plastic injection molding apparatus which eliminates the positioning of the ejector assembly between the pressure plates, to decrease the bulk of the plastic injection molding apparatus.

Yet another object of the present invention is to provide a plastic injection molding apparatus which eliminates the positioning of the runner assembly between the pressure plates of a plastic injection molding apparatus to allow the plastic injection molding apparatus to be of a smaller construction.

Another object of the present invention is to provide a plastic injection molding assembly which reduces the number of parts required to accomplish the molding operation.

These and other objects of the invention will become apparent upon reference to the following specification, drawings, and claims.

By the present invention, it is proposed to overcome the difficulties encountered heretofore. To this end, a plastic injection molding apparatus for molding a plastic article is provided. The apparatus is provided with leader pins to which is directly secured a first mold section. A second mold section is also directly coupled to the leader pins. When the two mold sections are moved into mated alignment with one another, they form a mold cavity and a parting line. Means are also provided for clamping the second mold section into sealed engagement with the first mold section.

In the preferred embodiment, since the mold sections are directly connected to the leader pins, the parting line surrounds the leader pins, and the mold sections, runner assembly, and ejection assembly are all used without housings. The elimination of housings reduces the weight and bulk of the plastic injection molding apparatus. Preferably, a pressure transfer arm is secured to the second mold section and the second mold section is moved a sufficient distance toward the first mold section to allow the insertion of a pressure applicator between the pressure transfer arm and the pressure transfer plate. The pressure applicator is used to clamp the first mold section and the second mold section into sealed engagement with one another. A plastic injection material is injected into the mold cavity and allowed to harden. The pressure applicator is used to declamp the second mold section from sealed engagement with the first mold section. The pressure applicator is moved from between the pressure transfer arm and the pressure transfer plate. The pressure applicator is moved a sufficient distance to allow the pressure transfer arm to be moved far enough toward the pressure transfer plate to prevent the insertion of the pressure applicator between the pressure transfer arm and the pressure transfer plate. The second mold section is also moved away from the first mold section a sufficient distance to remove the molded plastic material from the mold cavity.

Also in the preferred embodiment of the present invention, the pressure transfer plate is provided with an aperture through which the pressure transfer arm passes as the second mold section is moved away from the first mold section. A slide track is secured to the pressure transfer plate to allow the pressure applicator, a hydraulic linear actuator, to be moved over the aperture. The actuator may then brace against the pressure transfer plate in an effort to move the pressure transfer arm toward the first mold section.

BRIEF DESCRIPTION OF THE DRAWINGS

In the drawings:

FIG. 1 is a top plan view in partial cross-section showing the mold unit of the present invention in an open position;

FIG. 2 is a top plan view in partial cross-section showing the mold unit of FIG. 1 in a closed position, forming the mold cavity of the present invention;

FIG. 3 is a side elevation in partial cross-section showing the mold unit of FIG. 1 in a partially closed position;

FIG. 4 is a side elevation in partial cross-section showing the mold unit of FIG. 1 in a closed position, forming the mold cavity of the present invention; and FIG. 5 is a rear elevation of the mold unit of FIG. 4 showing the pressure transfer plate and the long stroke lift cylinders;

DETAILED DESCRIPTION OF THE INVENTION

Figure 6:
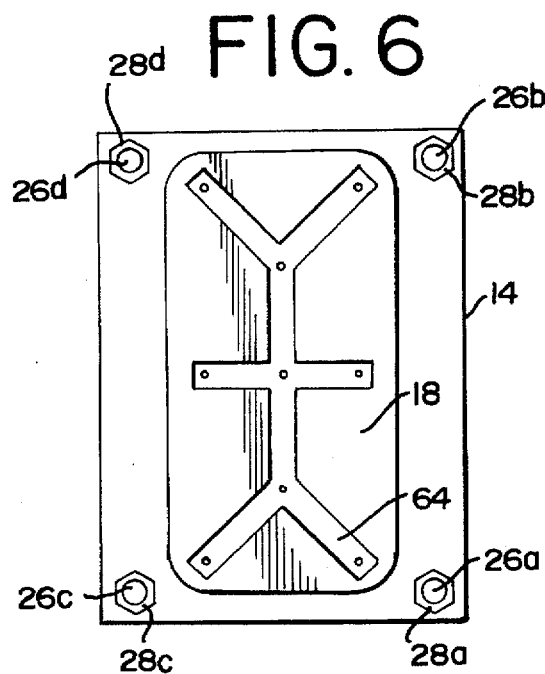
FIG. 6 is a front elevation of the mold unit of FIG. 4 showing the base plate and the plastic injection inlet.

In the figures, there is shown a plastic injection assembly 10 having a two-piece mold unit 12 coupled directly to a set of four leader pins 26a–d. By coupling the mold unit 12 directly to the leader pins 26a–d, the need for specially designed housings is eliminated. Additionally, a runner assembly 64 and ejector assembly 66 are bolted to the exterior of the mold unit 12. Since the runner assembly 64 and ejector assembly 66 are, therefore, not subject to the extreme pressures of typical injection assemblies, no specially designed housings are needed. The elimination of all housings not only eliminates the time and labor associated with manufacturing the housings, but also greatly reduces the weight of the plastic injection assembly 10 and decreases the length of the plastic injection assembly 10. The plastic injection assembly 10 is thereby rendered more portable and easier to manipulate. Downtime associated with failure of the assemblies is also reduced due to the elimination of the need to replace and integrate the assemblies 64 and 66.

Figure 7:
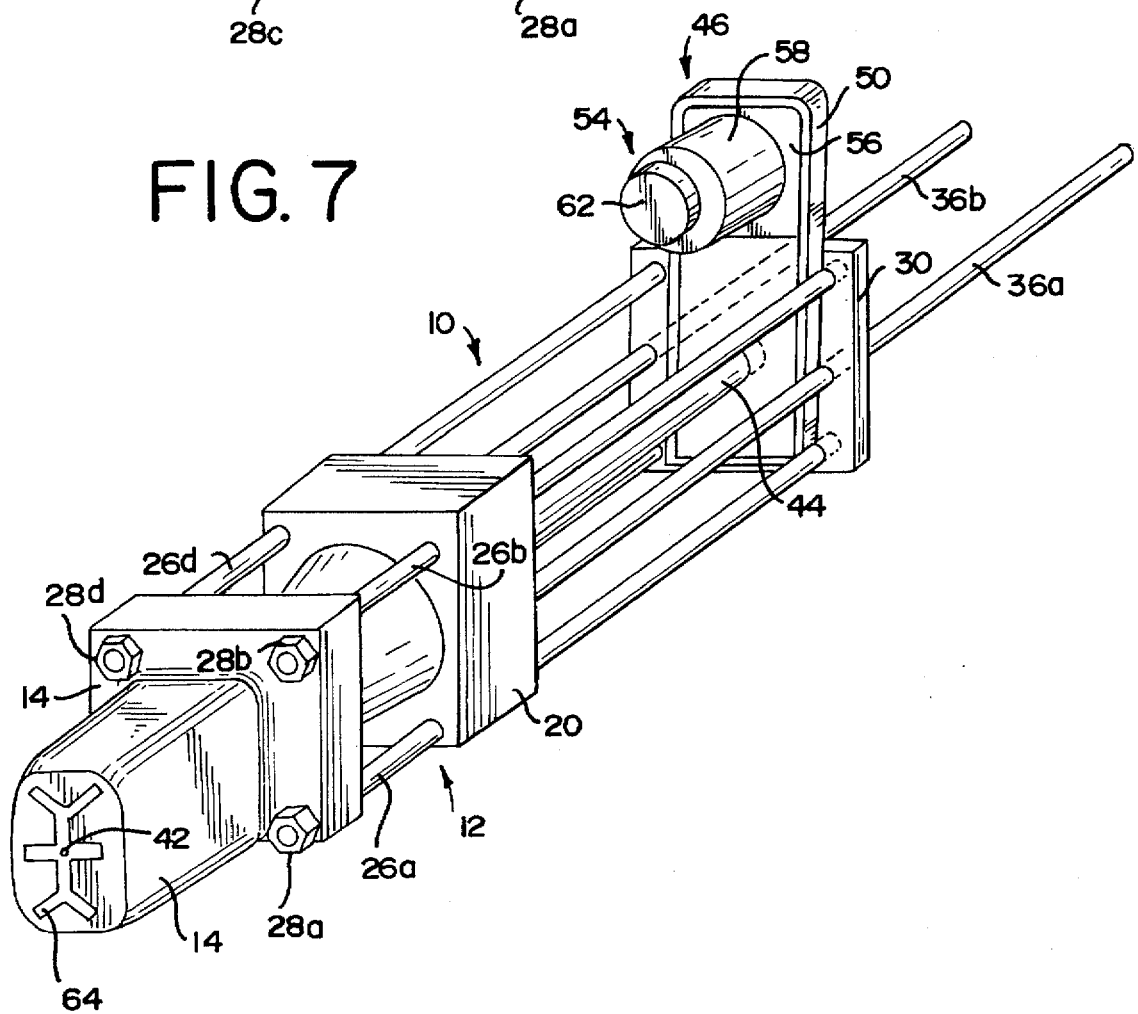
FIG. 7 is a perspective view of the mold unit of FIG. 1.

The plastic injection mold assembly 10 of the present invention includes a first mold section 14 having a front 16 and a back 18 (FIG. 1). The first mold section 14 is secured to the four leader pins 26a–d (FIGS. 6 and 7). The leader pins 26a–d are secured to the first mold section 14 by four threaded nuts 28a–d, or similar securement means.

The leader pins 26a–d are preferably constructed of cylindrical steel, and are threaded on both ends (FIG. 1). While one end of the leader pins 26a–d is secured to the first mold section 14, the other end of the leader pins 26a–d passes through and is secured to a pressure transfer plate 30 by a second set of four threaded nuts 32a–d (FIGS. 5 and 7). As shown in FIG. 5, the pressure transfer plate 30 is preferably a square steel block provided with a center aperture 34. The center aperture 34 allows the pressure transfer plate 30 to be located close to the first mold section 14 without restricting movement of a second mold section 20 along the leader pins 26a–d into and out of engagement with the first mold section 14. Like the first mold section 14, a second mold section 20 is provided with a front 22 and a back 24. A pair of long stroke lift cylinders 36a–b are also secured to the pressure transfer plate 30 (FIGS. 5 and 7). The long stroke lift cylinders 36a–b are preferably hydraulic and provide a large displacement with little force. The long stroke lift cylinders 36a–b are secured on one end to the pressure transfer plate 30 and on the other end to the first mold section 14 (FIGS. 3 and 6). The second mold section 20 is slidably coupled to the leader pins 26a–d and fits into mated alignment with the first mold section 14 to form a mold cavity 38 and a parting line 40 (FIG. 2).

As shown in FIG. 3, the mold cavity 38 is created between the front 16 of the first mold section 14 and the front 22 of the second mold section 20. The parting line 40 is the area of contact between the front 16 of the first mold section 14 and the front 22 of the second mold section 20. Provided on the one end of the plastic injection assembly 10 is an injection inlet 42 through which a plastic injection material may be injected into the mold cavity 38 through the runner assembly 64. Prior art devices use separate platens which are secured to the mold frame and move relative to one another along the mold frame. In the prior art, the mold sections are not connected directly to the mold frame, but are secured to the platens. The present invention eliminates such platens and connects the mold sections 14 and 20 directly to the leader pins 26a–d. By eliminating platens, both the length and the weight of the plastic injection assembly 10 are reduced in the present invention.

Prior art devices are typically constructed to accommodate various mold sections. To allow mold sections of various shapes to fit between the platens of these prior art devices, the mold sections are fitted with specially designed housings. While these housings are often standardized for smaller mold sections, larger sections must be specially manufactured, increasing both the time and cost associated with obtaining these larger mold sections. Since the present plastic injection assembly 10 has the mold sections 14 and 20 connected directly to the leader pins 26a–d instead of indirectly, through the use of platens, the need for specialized housings is eliminated as are the associated costs, delays, and added weight.

Secured directly to the rear 24 of the second mold section 20 is a pressure transfer arm 44 which is preferably cylindrical and constructed of steel or similarly durable material (FIG. 3). The pressure transfer arm 44 is preferably of a diameter less than the diameter of the aperture 34 provided through the pressure transfer plate 30. Secured to the pressure transfer plate 30 is a slide track 46 having a top plate 48, side walls 50, and support lips 52 (FIG. 1). Provided within the track 46 is a short stroke clamp cylinder assembly 54 having a slide plate 56 secured to a short stroke hydraulic cylinder 58. As shown in FIGS. 1 and 2, the track 46 extends beyond the transverse confines of the pressure transfer plate 30 to allow the short stroke hydraulic cylinder 58 to move completely out of the way of the second mold section 20 as the plastic injection assembly 10 is opened. The slide plate 56 is slightly larger than the short stroke hydraulic cylinder 58 to create a flange 60 therebetween. The flange 60 allows the slide plate 56 to fit into slidable engagement with the track 46. The side walls 50 of the track 46 maintain the slide plate 56 in alignment, while the support lips 52 keep the slide plate 56 from becoming disengaged from the track 46. The support lips 52 do not extend inward beyond the side walls 50 a greater distance than the length of the flange 60, to allow the track 46 to accurately align the short stroke hydraulic cylinder 58 during the molding process.

The short stroke hydraulic cylinder 58 is provided with a ram 62 which is preferably of a diameter greater than or equal to the diameter of the pressure transfer arm 44 to allow the ram 62 to easily engage and disengage the pressure transfer arm 44 during the molding process (FIG. 7). The tolerances of the plastic injection assembly 10 are preferably such that the ram 62 need only extend and retract a few centimeters throughout the molding process.

Secured between the first mold section 14 and the injection inlet 42 is the runner assembly 64 (FIG. 1). As shown in FIGS. 3 and 7, the runner assembly 64 is a manifold by which a plastic material is evenly distributed from the injection inlet 42 into the mold cavity 38. Whereas in prior art devices runner assemblies are typically provided between a lower platen and the mold section, the runner assembly 64 of the present device is bolted directly to the back 18 of the first mold section 14. Since the runner assembly 64 is positioned so as not to be subject to the clamping forces developed during the molding process, the runner assembly 64 does not require a specialized housing. By eliminating the need for a specialized housing, the weight, cost and length of the runner assembly 64 as well as the plastic injection assembly 10 are all decreased.

Just as the runner assembly 64 is bolted to the back 18 of the first mold section 14, the ejection assembly 66 is bolted to the back 24 of the second mold section 20 (FIG. 1). The ejection assembly 66 is provided with hydraulic cylinders 68 which are connected to fingers 70. The fingers 70 extend through the second mold section 20 and are flush with the mold cavity 38 (FIG. 2). By positioning the ejection assembly 66 so as to avoid the clamping forces, the weight, cost, and length savings realized by eliminating a housing for the runner assembly 64 can also be realized by eliminating a housing for the ejection assembly 66.

To begin the molding procedure, the short stroke clamp cylinder assembly 54 is slid along the track 46 a sufficient distance to allow the long stroke lift cylinders 36a–b to move the second mold section 20 along the leader pins 26a–d until the pressure transfer arm 44 passes through the aperture 34 provided in the pressure transfer plate 30 (FIG. 1). Because the long stroke lift cylinders 36a–b do not apply clamping pressure to the second mold section 20, they may be constructed of lighter weight, less expensive material than the short stroke hydraulic cylinder 58. The long stroke lift cylinders 36a–b move the second mold section 20 toward the first mold section 14 until there is sufficient clearance between the pressure transfer arm 44 and the pressure transfer plate 30 to slide the short stroke clamp cylinder assembly 54 therebetween (FIG. 3). The short stroke clamp cylinder assembly 54 is slid along the slide track 46 until the short stroke clamp cylinder assembly 54 is positioned between the pressure transfer arm 44 and the pressure transfer plate 30 as shown in FIG. 3. The side walls 50 and support lips 52 of the slide track 46 prevent the slide plate 56 from moving the short stroke hydraulic cylinder 58 out of alignment as the short stroke clamp cylinder assembly 54 is moved into and out of a position between the pressure transfer arm 44 and the pressure transfer plate 30.

Once the short stroke clamp cylinder assembly 54 has been moved into the position shown in FIG. 3, the short stroke hydraulic cylinder 58 is engaged to move the ram 62 into contact with the pressure transfer arm 44 (FIG. 2). As the short stroke hydraulic cylinder 58 applies pressure to the pressure transfer arm 44, the slide plate 56 transfers the force of the short stroke hydraulic cylinder 58 to the pressure transfer plate 30 and leader pins 26a–d. As pressure is applied to the pressure transfer arm 44, the second mold section 20 moves into mated engagement with the first mold section 14 so that the mold cavity 38 is set to receive the plastic injection material. Since the pressure on the second mold section 20 is transferred to the first mold section 14 and then on to the leader pins 26a–d, the leader pins 26a–d provide adequate bracing for the short stroke hydraulic cylinder 58 and eliminate the need for bulky external cylinders and support mechanisms. The plastic injection assembly 10 is, therefore, very compact which allows for easy movement and storage.

Once the second mold section 20 has been clamped into mated engagement with the first mold section 14, the plastic material is injected into the mold cavity 38 through the injection inlet 42 and the runner assembly 64 with an injection screw (not shown) or similar injection apparatus.

Preferably, the plastic material is injected into the mold cavity using low pressure molding techniques. Because the runner assembly 64 and the ejection assembly 66 are merely bolted onto the plastic injection apparatus 10, it is important to maintain the injection pressure below that which would damage either assembly 64 or 66. Additional benefits of the low pressure injection are lower clamping force and lower cost construction of the entire plastic injection apparatus 10, since each part has to withstand less pressure.

After the plastic material has sufficiently hardened, the short stroke hydraulic cylinder 58 is actuated to release the pressure on the pressure transfer arm 44 enough to allow the short stroke clamp cylinder assembly 54 to slide along the track 46 (FIG. 3). Once the short stroke clamp cylinder assembly 54 has been slid along the track 46 as shown in FIG. 1, the long stroke lift cylinders 36a–b are actuated to draw the second mold section 20, along the leader pins 26a–d and out of contact with the first mold section 14. As the long stroke lift cylinders 36a–b pull the second mold section 20, the pressure transfer arm 44 moves through the aperture 34 provided in the pressure transfer plate 30. Since the pressure transfer arm 44 passes through the aperture 34 in the pressure transfer plate 30, there is no need to form a more expensive, longer frame to accommodate the clearance necessary for the pressure transfer arm 44. Additionally, since the pressure transfer plate 30 is formed of steel, it provides adequate bracing for the short stroke clamp cylinder assembly 54, eliminating the need for a much larger and more complicated support system to brace the short stroke hydraulic cylinder 58.

After the second mold section 20 has been pulled away from the first mold section 14, the ejection assembly 66 is used to remove the finished part from the apparatus 10. Once the apparatus 10 is open, the hydraulic cylinders 68 of the ejection assembly 66 are activated to move the fingers 70 toward the first mold section 14. The fingers 70 are extended until they have dislodged the finished molded part from the second mold section 20. The fingers 70 are then retracted and the apparatus 10 is again ready to begin molding another part.

The foregoing description and drawings merely explain and illustrate the invention and the invention is not limited thereto, except insofar as the claims are so limited, as those skilled in the art who have the disclosure before them will be able to make modifications and variations therein without departing from the scope of the invention. For example, it is anticipated to be within the scope of the invention that mold sections of various sizes and shapes may be used to mold parts of varying dimensions.

What is claimed is:

1. A plastic injection molding apparatus for molding a plastic article, comprising:
   (a) leader pins;
   (b) a first mold section directly secured to said leader pins;
   (c) a second mold section directly coupled to said leader pins, said second mold section forming a parting line and a mold cavity with said first mold section when moved into sealed engagement with said first mold section; and
   (d) a pressure actuator capable of applying sufficient pressure to said second mold section to clamp said second mold section into sealed engagement with said first mold section, wherein said pressure actuator is slidable into a position proximate to said second mold section.

2. The plastic injection molding apparatus of claim 1, wherein said leader pins interconnect by said first mold section and said second mold section.

3. The plastic injection molding apparatus of claim 1, wherein said first mold section is directly secured to said leader pins in a manner which maintains said leader pins in a predetermined orientation relative to one another.

4. The plastic injection molding apparatus of claim 1, wherein said parting line surrounds said leader pins when said second mold section is moved into sealed engagement with said first mold section.

5. The plastic injection molding apparatus of claim 4, wherein said pressure actuator is a hydraulic linear actuator.

6. The plastic injection molding apparatus of claim 5, further comprising a pressure arm secured to said second mold section, said pressure arm being capable of transferring force to said second mold section from said hydraulic linear actuator.

7. The plastic injection molding apparatus of claim 6, further comprising a pressure transfer plate secured to said leader pins, wherein said pressure transfer plate is provided with an aperture capable of receiving said pressure arm, and wherein said second mold section is between said first mold section and said pressure transfer plate.

8. The plastic injection molding apparatus of claim 7, wherein said leader pins interconnect said first mold section and said pressure transfer plate.

9. The plastic injection molding apparatus of claim 7, further comprising a track secured to said pressure transfer plate and slidably coupled to said hydraulic linear actuator in a manner which allows said hydraulic linear actuator to slide into and out of said position between said pressure transfer plate and said second mold section.

10. The plastic injection molding apparatus of claim 9, further comprising a supplemental hydraulic linear actuator secured to said hydraulic linear actuator and being capable of sliding said hydraulic linear actuator into and out of said position between said pressure transfer plate and said second mold section.

11. The molding apparatus of claim 9, further comprising means secured to said pressure transfer plate and said second mold section for moving said pressure arm a sufficient distance from said pressure transfer plate to allow said hydraulic linear actuator to be moved into a position between said pressure arm and said pressure transfer plate.

12. The molding apparatus of claim 11, wherein said pressure arm moving means is a long stroke hydraulic cylinder.

13. The plastic injection molding apparatus of claim 1, further comprising an ejection assembly secured to a portion of said second mold section which is not subject to clamping forces during clamping of said second mold section into sealed engagement with said first mold section.

14. The plastic injection molding apparatus of claim 1, further comprising a runner assembly secured to a portion of said first mold section which is not subject to clamping forces during clamping of said second mold section into sealed engagement with said first mold section.

15. A plastic injection molding apparatus for molding a plastic article, comprising:
   (a) leader pins;
   (b) a one-piece first mold section directly secured to said leader pins in a manner which maintains said leader pins in a predetermined orientation relative to one another;
   (c) a pressure transfer plate secured to said leader pins, said pressure transfer plate being provided with an aperture;
   (d) a one-piece second mold section directly and slidably coupled to said leader pins, said second mold section forming a parting line and a mold cavity with said first mold section when moved into sealed engagement with said first mold section;
   (e) a pressure arm secured to said second mold section, said pressure arm being of a diameter sufficient to allow said pressure arm to pass through said aperture provided in said pressure transfer plate;
   (f) a track secured to said pressure transfer plate;
   (g) a pressure actuator slidably coupled to said track, said pressure actuator having a dimension sufficiently narrow to allow said pressure actuator to slide into a position between said pressure arm and said pressure transfer plate, wherein said pressure actuator covers said aperture provided in said pressure transfer plate.

16. The molding apparatus of claim 15, wherein said pressure actuator is a hydraulic linear actuator.

17. The molding apparatus of claim 15, further comprising means secured to said pressure transfer plate and said second mold section for moving said pressure arm a sufficient distance from said pressure transfer plate to allow said pressure actuator to be moved into a position between said pressure arm and said pressure transfer plate.

18. The molding apparatus of claim 17, wherein said pressure arm moving means is a long stroke hydraulic cylinder.

19. The plastic injection molding apparatus of claim 15, further comprising an ejection assembly secured to a portion of said second mold section which is not subject to clamping forces during clamping of said second mold section into sealed engagement with said first mold section.

20. The plastic injection molding apparatus of claim 15, further comprising a runner assembly secured to a portion of said first mold section which is not subject to clamping forces during clamping of said second mold section into sealed engagement with said first mold section.

21. A plastic injection molding apparatus for molding a plastic article, said plastic injection molding apparatus comprising:

(a) a first mold section;

(b) a plate having an aperture therein;

(c) a second mold section between said first mold section and said plate, wherein said second mold section is engageable with and retractable from said first mold section;

(d) a pressure arm on said second mold section; and (e) a cylinder assembly slidable from a first position between said plate and said second mold section to a second position, wherein said cylinder assembly is capable of supplying sufficient pressure to said pressure arm to clamp said second mold section into sealed engagement with said first mold section when said cylinder assembly is in said first position, and wherein said pressure arm is receivable in said aperture of said plate when said cylinder assembly is in said second position and when said second mold section is retracted from said first mold section.

22. The plastic injection molding apparatus according to claim 21, wherein said cylinder assembly comprises:

(a) a ram; and (b) a hydraulic cylinder capable of extending said ram, said ram pushable on said pressure arm when said ram is extended by said hydraulic cylinder when said hydraulic cylinder is in said first position.

23. The plastic injection molding apparatus according to claim 21, further comprising leader pins, wherein said first mold section is directly secured to said leader pins, wherein said second mold section is directly coupled to said leader pins, and wherein said second mold section forms a parting line and a mold cavity with said first mold section when said second mold section is engaged with said first mold section.

24. The plastic injection molding apparatus according to claim 23, wherein said first mold section is directly secured to said leader pins in a manner which maintains said leader pins in a predetermined orientation relative to one another.

25. The plastic injection molding apparatus according to claim 23, wherein said parting line surrounds said leader pins when said second mold section is engaged with said first mold section.

26. The plastic injection molding apparatus according to claim 22, wherein said pressure arm is capable of transferring a force to said second mold section from said ram upon said ram extending when said hydraulic cylinder is in said first position.

27. The plastic injection molding apparatus according to claim 23, wherein said leader pins interconnect said first mold section and said plate.

28. The plastic injection molding apparatus according to claim 21, further comprising a track secured to said plate and slidably coupled to said cylinder assembly in a manner which allows said cylinder assembly to slide to and from said first position and said second position.

29. The plastic injection molding apparatus according to claim 28, further comprising a linear actuator secured to said cylinder assembly, wherein said linear actuator is capable of sliding said cylinder assembly to and from said first position and said second position along said track.

30. The plastic injection molding apparatus according to claim 21, further comprising means secured to said plate and said second mold section for moving said pressure arm a sufficient distance from said plate to allow said cylinder assembly to be slid to said first position.

31. The plastic injection molding apparatus according to claim 30, wherein said means for moving said pressure arm comprises a long stroke hydraulic cylinder.

32. The plastic injection molding apparatus according to claim 21, further comprising an ejection assembly secured to said second mold section, wherein said ejection assembly is not subject to clamping forces when said second mold section is clamped into sealed engagement with said first mold section.

33. The plastic injection molding apparatus according to claim 21, further comprising a runner assembly secured to said first mold section, wherein said runner assembly is not subject to clamping forces when said second mold section is clamped into sealed engagement with said first mold section.

34. A plastic injection molding apparatus for molding a plastic article, comprising:

(a) a first mold section;

(b) a second mold section forming a mold cavity with said first mold section when moved into sealed engagement with said first mold section; and (c) a pressure actuator slidable into a position proximate to said second mold section, said pressure actuator capable of supplying sufficient pressure to said second mold section to clamp said second mold section into sealed engagement with said first mold section to form said mold cavity.

* * * * *